United States Patent
Kuth

(10) Patent No.: US 6,843,486 B2
(45) Date of Patent: Jan. 18, 2005

(54) BRAKE HANDLE FOR CABLE-PULL BRAKES ON INLINE-SKATES

(76) Inventor: Rudolf Kuth, Grosstalstr. 101, Freiburg 79117 (DE)

( * ) Notice: Subject to any disclaimer, the term of this patent is extended or adjusted under 35 U.S.C. 154(b) by 12 days.

(21) Appl. No.: 10/275,436

(22) PCT Filed: May 3, 2001

(86) PCT No.: PCT/DE01/01698

§ 371 (c)(1), (2), (4) Date: Nov. 6, 2002

(87) PCT Pub. No.: WO01/85270

PCT Pub. Date: Nov. 15, 2001

(65) Prior Publication Data

US 2003/0107193 A1 Jun. 12, 2003

(30) Foreign Application Priority Data

May 9, 2000 (DE) .......................................... 100 22 580

(51) Int. Cl.[7] .............................................. A63C 17/14
(52) U.S. Cl. .............................. 280/11.204; 280/11.212
(58) Field of Search ........................ 280/11.19, 11.204, 280/11.201, 11.212, 11.213, 11.214, 11.221

(56) References Cited

U.S. PATENT DOCUMENTS

| | | | | |
|---|---|---|---|---|
| 1,497,224 A | * | 6/1924 | Ormiston ............... | 280/11.214 |
| 4,300,781 A | * | 11/1981 | Riggs ..................... | 280/11.212 |
| 5,340,131 A | * | 8/1994 | Smathers et al. ...... | 280/11.212 |
| 5,464,235 A | | 11/1995 | Goldman et al. | |
| 5,509,328 A | * | 4/1996 | Lai ........................ | 74/551.3 |
| 5,584,491 A | * | 12/1996 | Kronyak, Jr. .......... | 280/11.212 |
| 5,685,198 A | * | 11/1997 | Hawkins ................ | 74/502.2 |
| 5,743,540 A | | 4/1998 | Wilhelm, III | |
| 5,791,664 A | * | 8/1998 | Koester, Jr. ............ | 280/11.216 |
| 5,860,492 A | * | 1/1999 | Talaska .................. | 188/5 |
| 5,934,691 A | * | 8/1999 | Stivali ................... | 280/11.212 |
| 5,992,862 A | * | 11/1999 | Mitchell ................ | 280/11.216 |
| 6,592,129 B1 | * | 7/2003 | Gates ..................... | 280/11.204 |

FOREIGN PATENT DOCUMENTS

| | | |
|---|---|---|
| DE | 296 20 280 | 3/1997 |
| DE | 297 16 432 | 12/1997 |

* cited by examiner

Primary Examiner—Christopher P. Ellis
Assistant Examiner—Brian Swenson
(74) Attorney, Agent, or Firm—Gudrun E. Hackett

(57) ABSTRACT

A brake handle, to be worn on a knee of a skater, for inline skate pull-cable brakes with a pull cable, has a brake handle body and an adjusting shaft arranged in the brake handle body. A pull cable is connected to the adjusting shaft. The adjusting shaft is employed to coil or uncoil the pull cable for shortening or extending the length of the pull cable so that the pull cable can be individually adjusted to the needs of the skater.

5 Claims, 2 Drawing Sheets

BRAKE HANDLE FOR CABLE-PULL BRAKES ON INLINE-SKATES

BACKGROUND OF THE INVENTION

The invention relates to a brake handle for cable-pull brakes comprising a pull cable on inline-skates, wherein the handle is to be worn on the knee.

In the past, brake actuation was achieved substantially by means of pull cables, hydraulic hoses, back and forth movements of the knee, or by means of rotating the foot inwardly or outwardly. The pull cable arrangements and the hydraulic hose arrangements in the past have been guided along the body and arms to the palms of the hands. They are generally of a large size and uncomfortable and thus impair skating. Moreover, the fastening sleeves easily come loose so that there is a risk of being caught in the cables and hoses; this can cause a dangerous fall. Moreover, the effect that can be generated by applying pressure by hand is too small and the brakes are therefore ineffective as a result of the unfavorable leverage conditions.

A brake activation by moving the knee back and forth or also by carrying out a rotation in the foot area is always dangerous because both movements are also carried out during normal skating and can lead to a fall when the brake activation occurs accidentally.

DE 297 16 432 U1 describes a hand brake for inline skates wherein the handle is arranged within the knee area. DE 296 20 280 U1 also describes a handle for an inline skate brake which is fastened on a knee protector. Moreover, U.S. Pat. No. 5,743,540 describes a simple cable pull brake whose cable can be adjusted to different lengths by means of a simple intermediate member.

A brake handle of the aforementioned kind is known from U.S. Pat. No. 5,464,235 wherein the handle is attached between the hip and knee of the skater. By means of the handle, the pull cable can be coiled and uncoiled like a measuring tape. A disadvantage of this known handle is that a fine adjustment of the pull cable length is not possible because each revolution causes too much or too little cable to be coiled or uncoiled. An individual adjustment of the cable length according to the body height of the skater, respectively, is thus not possible. Since, moreover, the pull cable extends to the hip of the skater, the arm can get caught in the pull cable and can cause in accidental fall.

SUMMARY OF THE INVENTION

It is thus an object of the invention to further develop a brake handle of the aforementioned kind such that the length of the pull cable can be varied individually and the operation of the handle should be reliable and safe.

As a solution to this object, it is proposed in accordance with the present invention that the brake handle of the aforementioned kind is configured in that an adjusting shaft is arranged in the brake handle onto which the pull cable is coiled or from which it is uncoiled and in this way is shortened or extended.

By arranging the adjusting shaft within the hollow brake handle, the pull cable can be coiled when it is to be shortened or uncoiled when it is to be extended. In this way, an adjustment is possible in regard to the cable length required individually for each skater. Moreover, the pull cable does not extend to the hip as in the handle of the aforementioned kind so that the operation of the handle overall is more reliable and safe and an accidental fall can be prevented.

In order to safely secure the adjusting shaft in an adjusted position, one embodiment of the invention provides that the adjusting shaft is secured by a self-locking securing nut integrated into the brake handle. Advantageously, the adjusting shaft has a polygonal shaft head wherein the adjusting shaft is secured against rotation by the securing nut in a recess in the brake handle matching the polygonal shaft head. The adjusting shaft with its polygonal shaft head is pulled by the securing nut on the opposite end of the adjusting shaft into the matching polygonal recess within the brake handle and is safely secured in this way. The adjusted cable length thus cannot change its length accidentally. For adjusting the length, the securing nut must be released to such an extent that the polygonal shaft head can be pushed out of the recess and out of the brake handle, this being effected by pushing on the securing nut on the other end of the adjusting shaft. After the adjustment has been carried by coiling or uncoiling the pull cable onto or from the adjusting shaft, the shaft can then be fixed in position and secured again by being pulled or pushed into the recess of the brake handle and by subsequently tightening the securing nut.

A further embodiment of the invention provides that the pull cable is guided from the adjusting shaft in the interior through the brake handle and exits downwardly from it to the exterior through an opening. Expediently, the brake handle is held and secured in a corresponding holder. In order to secure the holder safely on the skater, a further embodiment of the invention provides that the holder for the brake handle is secured by straps or bands with buckles or hook-and-loop fasteners on the body of the skater or directly on the knee protector.

BRIEF DESCRIPTION OF THE DRAWINGS

The invention will be explained in more detail in the following with the aid of the drawing. The drawing shows one embodiment of the invention. It is illustrated in.

DESCRIPTION OF PREFERRED EMBODIMENTS

Figure 1:
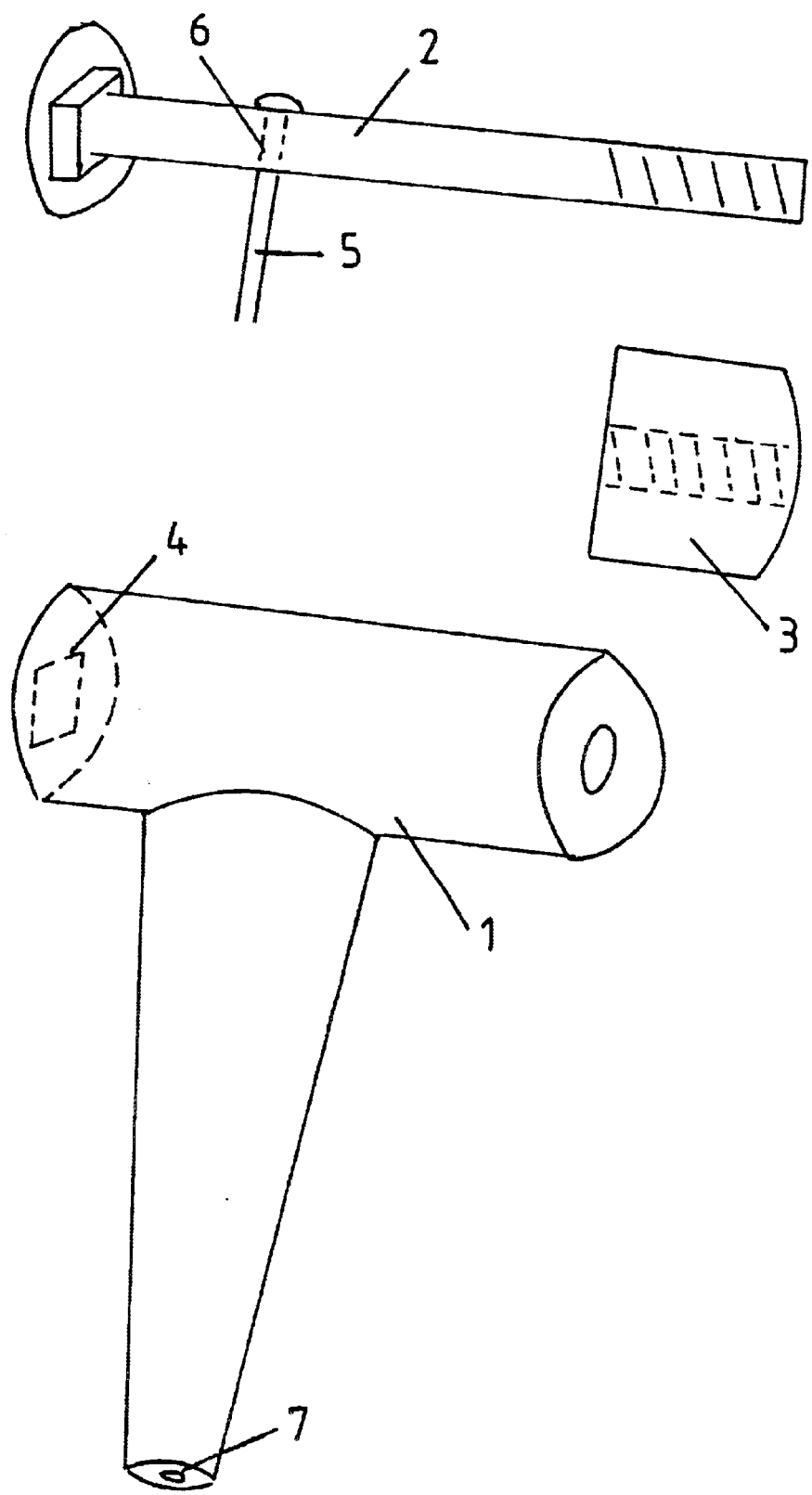
FIG. 1 the brake handle disassembled into a handle body, adjusting shaft for the pull cable, and securing nut.

FIG. 1 shows a brake handle 1 with a recess 4 for receiving an adjusting shaft 2. After a polygonal shaft head of the adjusting shaft 2 snaps into place in the recess 4 the adjusting shaft 2 is secured in its position by fastening a securing nut 3; accidental rotation is thus prevented. The pull cable 5 of the cable pull is pulled through a through bore 6 in the adjusting shaft 2 and secured in position. The pull cable 5 is guided downwardly out of the brake handle 1 via a passage opening 7.

Figure 2:
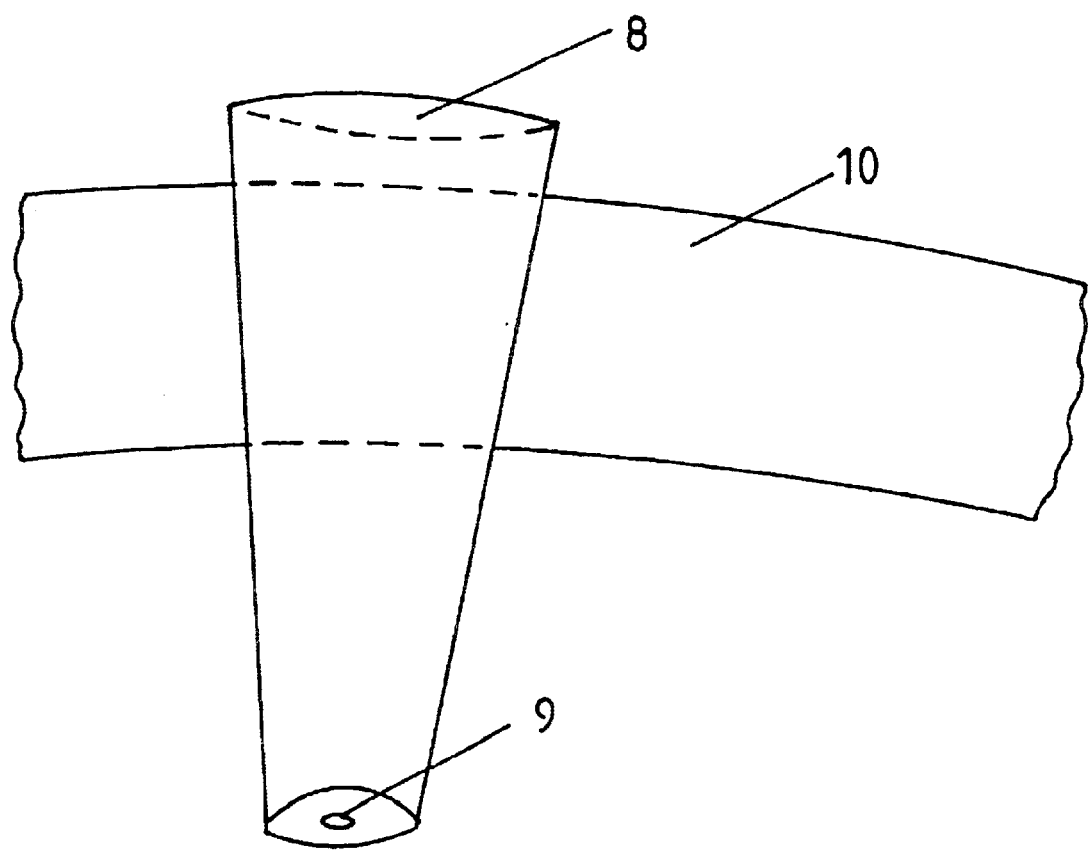
FIG. 2 a holder, comprising a fastening strap, for receiving the brake handle.

FIG. 2 shows a holder 8 for receiving, for functionally stable positional securing, and guiding the brake handle 1 and the pull cable 5. The pull cable 5 is guided through the through opening 9 of the holder downwardly along the lower leg of the skater to the brake (with or without pull cable sleeve). The holder 8 is fastened with a strap 10 on the knee of the skater. Preferably, an elastic hook-and-loop closure is used. However, several straps made of different materials can be used adjacently or the holder 8 alternatively can be fastened directly on the knee protector of the skater. The holder 8 is open in the downward direction for allowing passage of the cable. The brake handle 1 and the holder 8 taper in the downward direction in a matching way so that the holder 8 secures the brake handle 1 in a defined terminal position.

Since the shaft head is quadrangular, a fixation of the adjusting shaft 2 can be carried out anew already after a 90° rotation, i.e., after ¼ of a rotation of the adjusting shaft 2. In this way, a fine adjustment of the length of the pull cable with small steps is possible (approximately 6 to 8 mm per adjusting step, respectively).

With the brake handle according to the invention, the length of the pull cable can be adjusted individually. For this purpose, the securing nut 3 is released to such an extent that the polygonal shaft head can be pushed out of the recess 4 of the brake handle 1 by applying pressure on the securing nut 3. By coiling or uncoiling the pull cable 5, the required length of the pull cable is adjusted. Subsequently, the adjusting shaft 2 with the shaft head is again pulled back into the recess 4 and secured in position by tightening the securing nut 3. The cable length adjusted in this way can therefore not change accidentally. As a result of the construction and the type of attachment of the brake handle, the force to be applied by the skater for braking is realized by stretching the knee area and the back and, additionally, by pulling the brake handle with the arm. In this way, the cable force acting on any type of brake system is enormously high and has not been achieved by any other system.

What is claimed is:

1. A brake handle, to be worn on a knee of a skater, for inline skate pull-cable brakes comprising a pull cable, the brake handle comprising:

a brake handle body (1) having an interior;

an adjusting shaft (2) arranged in the interior of the brake handle body (1);

a pull cable (5) connected to the adjusting shaft (2), wherein the adjusting shaft is configured to coil or uncoil the pull cable (5) and to be secured in a selected position with a self-locking securing nut (3) connected to the adjusting shaft and integrated into the brake handle body (1) for shortening or extending a length of the pull cable (6) in order to individually adjust the length of the pull cable to a body height of skater.

2. The brake handle according to claim 1, wherein the adjusting shaft (2) has a polygonal shaft head and the brake handle body (1) has a recess (4) matching the polygonal shaft head, wherein the adjusting shaft (2) is secured by the securing nut (3) against rotation in the recess (4).

3. The brake handle according to claim 1, wherein the pull cable (5) is guided, beginning at the adjusting shaft (2), in the interior of the brake handle body (1) and exits in a downward direction the brake handle body (1) through a passage opening (7) of the brake handle body (1).

4. The brake handle according to claim 1, further comprising a holder (8), wherein the brake handle (1) is guided and secured in the holder (8).

5. The brake handle according to claim 4, wherein the holder (8) is configured to be fastened by straps (10), provided with buckles or hook-and-loop closures, on a body of a skater or on a knee protector worn by the skater.

* * * * *